US009527699B2

(12) United States Patent

Liljedahl

(10) Patent No.: US 9,527,699 B2

(45) Date of Patent: Dec. 27, 2016

(54) LIFT CONTROL SYSTEMS FOR LIFTING DEVICES AND LIFTING DEVICES COMPRISING THE SAME

(71) Applicant: Liko Research & Development AB, Lulea (SE)

(72) Inventor: Gunnar Liljedahl, Lulea (SE)

(73) Assignee: LIKO RESEARCH & DEVELOPMENT AB, Lulea (SE)

( * ) Notice: Subject to any disclaimer, the term of this patent is extended or adjusted under 35 U.S.C. 154(b) by 961 days.

(21) Appl. No.: 13/796,100

(22) Filed: Mar. 12, 2013

(65) Prior Publication Data

US 2013/0168622 A1 Jul. 4, 2013

Related U.S. Application Data

(63) Continuation of application No. 12/717,532, filed on Mar. 4, 2010, now Pat. No. 8,474,794.

(Continued)

(51) Int. Cl.

*B60B 29/00* (2006.01)

*B66C 15/06* (2006.01)

(Continued)

(52) U.S. Cl.

CPC ................. *B66C 15/06* (2013.01); *A61G 7/10* (2013.01); *A61G 7/1017* (2013.01);

(Continued)

(58) Field of Classification Search

CPC ............. B66F 15/00; B66F 7/08; B66F 13/00; B61D 19/002

See application file for complete search history.

(56) References Cited

U.S. PATENT DOCUMENTS

| | | | |
|---|---|---|---|
| 5,474,083 | A | 12/1995 | Church et al. |
| 5,662,311 | A | 9/1997 | Waedekin et al. |

(Continued)

FOREIGN PATENT DOCUMENTS

| | | |
|---|---|---|
| DE | 3330345 | 3/1985 |
| EP | 0785168 | 7/1997 |

(Continued)

OTHER PUBLICATIONS

Park, Robotic Smart House to Assist People with Disabilities, Auton Robot magazine, 2007, pp. 183-198.

(Continued)

*Primary Examiner* — Lee D Wilson

(74) *Attorney, Agent, or Firm* — Dinsmore & Shohl LLP

(57) ABSTRACT

A control system for a lifting device and a lifting device comprising the same are disclosed. The control system includes a control unit comprising a processor with a memory communicatively coupled to the processor and having computer readable and executable instructions. A battery is electrically coupled to the control unit in addition to at least one indicator. The processor executes the computer readable and executable instructions to: determine an operating characteristic of the lifting device and an operating time of the lifting device as the lifting device is actuated; determine an accumulated load-time parameter for the lifting device based on the operating characteristic and the operating time; store the accumulated load-time parameter in the memory of the lift control system; compare the accumulated load-time parameter to a service constant; and provide an indication the indicator that a lift structural component requires service based on the comparison.

27 Claims, 5 Drawing Sheets

Related U.S. Application Data

(60) Provisional application No. 61/158,050, filed on Mar. 6, 2009.

(51) Int. Cl.

| | |
|---|---|
| ***A61G 7/10*** | (2006.01) |
| ***B66C 13/40*** | (2006.01) |
| ***B66C 23/48*** | (2006.01) |
| ***B66C 23/62*** | (2006.01) |
| ***B66C 13/22*** | (2006.01) |
| ***B66C 23/46*** | (2006.01) |

(52) U.S. Cl.

CPC ......... *A61G 7/1063* (2013.01); *A61G 7/1065* (2013.01); *B66C 13/22* (2013.01); *B66C 13/40* (2013.01); *B66C 15/065* (2013.01); *B66C 23/46* (2013.01); *B66C 23/48* (2013.01); *B66C 23/62* (2013.01); *A61G 7/1046* (2013.01); *A61G 7/1061* (2013.01); *A61G 2203/12* (2013.01); *A61G 2203/32* (2013.01); *A61G 2203/72* (2013.01)

(56) References Cited

U.S. PATENT DOCUMENTS

| | | | | |
|---|---|---|---|---|
| 5,682,630 | A | 11/1997 | Simon | |
| 5,726,911 | A | 3/1998 | Canada et al. | |
| 5,740,887 | A | 4/1998 | Unger et al. | |
| 5,809,591 | A | 9/1998 | Capaldi et al. | |
| 5,852,351 | A | 12/1998 | Canada et al. | |
| 6,279,183 | B1 | 8/2001 | Kummer et al. | |
| 6,341,393 | B1 | 1/2002 | Votel | |
| 6,986,179 | B2 | 1/2006 | Varadharajulu et al. | |
| 7,021,427 | B2 | 4/2006 | Skovgaard et al. | |
| 7,237,287 | B2 | 7/2007 | Weismiller et al. | |
| 7,338,459 | B2 | 3/2008 | Swidler et al. | |
| 7,389,552 | B1 | 6/2008 | Reed et al. | |
| 7,392,554 | B1 | 7/2008 | Su et al. | |
| 7,398,571 | B2 | 7/2008 | Souke | |
| 7,462,138 | B2 | 12/2008 | Shetty et al. | |
| 7,511,442 | B2 | 3/2009 | Jehle et al. | |
| 7,533,429 | B2 | 5/2009 | Menkedick et al. | |
| 7,610,637 | B2 | 11/2009 | Menkedick et al. | |
| 7,634,824 | B2 | 12/2009 | Gramkow et al. | |
| 7,690,056 | B2 | 4/2010 | Moffa et al. | |
| 7,827,630 | B2 | 11/2010 | Bostelman et al. | |
| 7,938,756 | B2 | 5/2011 | Rodetsky et al. | |
| 7,962,981 | B2 | 6/2011 | Lemire et al. | |
| 7,987,069 | B2 | 7/2011 | Rodgers et al. | |
| 8,006,332 | B2 | 8/2011 | Lemire et al. | |
| 8,085,146 | B2 | 12/2011 | Rees | |
| 8,302,227 | B2 | 11/2012 | Jensen | |
| 8,474,794 | B2 * | 7/2013 | Liljedahl .............. | A61G 7/1017 254/120 |
| 2005/0135907 | A1 | 6/2005 | Romano et al. | |
| 2007/0163045 | A1 | 7/2007 | Becker et al. | |
| 2007/0267250 | A1 | 11/2007 | Wolff | |
| 2008/0126132 | A1 | 5/2008 | Warner et al. | |
| 2008/0183493 | A1 | 7/2008 | Bogue | |
| 2009/0044332 | A1 | 2/2009 | Parsell et al. | |
| 2009/0044334 | A1 | 2/2009 | Parsell et al. | |
| 2009/0077737 | A1 | 3/2009 | Dyhr et al. | |
| 2009/0151489 | A1 | 6/2009 | Jensen | |
| 2009/0299528 | A1 | 12/2009 | Jensen | |
| 2010/0005590 | A1 | 1/2010 | Jensen | |
| 2010/0097181 | A1 | 4/2010 | Sorensen et al. | |
| 2010/0224841 | A1 * | 9/2010 | Liljedahl .............. | A61G 7/1017 254/120 |
| 2010/0270252 | A1 | 10/2010 | Chepurny et al. | |
| 2011/0080016 | A1 | 4/2011 | Lambarth et al. | |
| 2011/0082655 | A1 | 4/2011 | Todd et al. | |
| 2011/0099716 | A1 | 5/2011 | Jackson | |
| 2011/0107516 | A1 | 5/2011 | Jackson et al. | |
| 2011/0166826 | A1 | 7/2011 | Jensen et al. | |
| 2011/0178818 | A1 | 7/2011 | Jonsson | |
| 2011/0277242 | A1 | 11/2011 | Dionne et al. | |
| 2012/0198612 | A1 | 8/2012 | Tindall | |
| 2013/0168622 | A1 * | 7/2013 | Liljedahl .............. | A61G 7/1017 254/8 R |

FOREIGN PATENT DOCUMENTS

| | | |
|---|---|---|
| EP | 865245 | 9/1998 |
| EP | 1561445 | 8/2005 |
| EP | 1954234 | 8/2008 |
| WO | 2002087720 | 11/2002 |
| WO | 2004069125 | 8/2004 |
| WO | 2005074853 | 8/2005 |
| WO | 2006036980 | 4/2006 |
| WO | 2007006753 | 1/2007 |
| WO | 2008080404 | 7/2008 |
| WO | 2008096210 | 8/2008 |
| WO | 2010031694 | 3/2010 |
| WO | 2010117820 | 10/2010 |
| WO | 2010145654 | 12/2010 |
| WO | 2011041170 | 4/2011 |
| WO | 2011044204 | 4/2011 |

OTHER PUBLICATIONS

Arjohuntleigh Maxi Move—Product Specification regarding Lifting & Transfers, [publication date unknown], [Retrieved Mar. 4, 2010], Retrieved from the internet <URL:http://www.arjo.com/usah/ProductSpecification.asp?PageNumber=2940&ProductCategory_Id=14&Product_Id=474>.

Arjohuntleigh Tenor—Product Specification, [publication date unknown], [Retrieved Mar. 4, 2010], Retrieved from the internet <URL:http://www.arjo.com/usah/ProductSpecification.asp?PageNumber=2940&ProductCategory_Id=14&Product_Id=28>.

Molift Partner 205 Operatur Manual, BM05 English, Publication Date Oct. 2008.

* cited by examiner

LIFT CONTROL SYSTEMS FOR LIFTING DEVICES AND LIFTING DEVICES COMPRISING THE SAME

CROSS REFERENCE TO RELATED APPLICATIONS

The present specification is a continuation of U.S. patent application Ser. No. 12/717,532 filed Mar. 4, 2010 and entitled "Lift Control Systems For Lifting Devices and Lifting Devices Comprising the Same" which claims priority to U.S. Provisional Patent Application Ser. No. 61/158,050 field Mar. 6, 2009 and entitled "Control And Diagnostic Systems for Lifting Devices."

TECHNICAL FIELD

The present specification generally relates to lifting devices and, more specifically, to lift control systems for use in conjunction with lifting devices.

BACKGROUND

Lifting devices, such as patient lifts used in the health care industry, may generally comprise an actuator, such as an electric motor or similar actuator, which may be coupled to a mechanical lifting arm or cable lifting system. The actuator facilitates actuation of the mechanical lifting arm or cable lifting system thereby raising and/or lowering a load attached to the lifting arm or cable lifting system. For example, when the lifting device is a patient lift, a sling or other support apparatus may be attached to the mechanical lifting arm or cable lifting system. A patient may be positioned in the sling and a lift control system coupled to the actuator may be used by an operator to activate the actuator which, in turn, raises and/or lowers the patient by actuating the mechanical lifting arm or cable lifting system. The electrical current supplied to the actuator by the lift control system may vary depending on the weight of the patient being lifted. For example, lifting a heavier patient may require a relatively greater amount of electrical current be supplied to the actuator to facilitate lifting as compared to a relatively lighter patient.

Repeated and prolonged use of the lifting device may result in wear and/or degradation of the performance of the lifting device thus necessitating periodic maintenance. Such maintenance may include verification of the operation of the lifting device and repair or replacement of various components of the lifting device. However, the frequency and type of maintenance required may vary depending on a variety of factors including, but not limited to, the amount and frequency of use of the lifting device and the weight of the loads lifted and/or lowered with the lifting device. Such variations may not be adequately addressed through periodic maintenance.

Accordingly, a need exists for alternative lift control systems for use in conjunction with servicing and maintaining lifting devices.

SUMMARY

According to one embodiment, a lift control system for operating a lifting device comprising a lift actuator coupled to a lift arm includes a control unit comprising a processor with a memory communicatively coupled to the processor and having computer readable and executable instructions. A battery is electrically coupled to the control unit in addition to at least one indicator. The processor executes the computer readable and executable instructions to: determine an accumulated number of initiated battery charging events; determine an accumulated number of incomplete battery charging events; determine an accumulated number of battery replacements; determine at least one operating characteristic of the lifting device and an operating time of the lifting device as the lifting device is actuated; determine an accumulated load-time parameter for the lifting device based on the at least one operating characteristic and the operating time; store the accumulated load-time parameter in the memory of the lift control system; compare the accumulated load-time parameter to a service constant; and provide an indication with the at least one indicator that a lift structural component requires service based on the comparison of the accumulated load-time parameter to the service constant.

In another embodiment, a lifting device for raising and lowering a payload coupled to the lifting device includes a lift mast mechanically coupled to a base at a first end of the lift mast and a lift arm pivotally coupled to the lift mast at a second end of the lift mast. A lift actuator is mechanically coupled to the lift mast and the lift arm such that actuation of the actuator raises or lowers the lift arm relative to the base. A lift control system is communicatively coupled to the lift actuator and includes a control unit comprising a processor and a memory having computer readable and executable instructions. At least one indicator may be electrically coupled to the control unit. The processor executes the computer readable and executable instructions to: determine at least one operating characteristic of the lifting device and an operating time of the lifting device as the lifting device is actuated; determine an accumulated load-time parameter for the lifting device based on the at least one operating characteristic and the operating time; store the accumulated load-time parameter in the memory of the lift control system; compare the accumulated load-time parameter to a service constant; and provide an indication with the at least one indicator that a lift structural component requires service based on the comparison of the accumulated load-time parameter to the service constant.

In another embodiment, a method for operating a lifting device comprising a lift actuator for raising and lowering a load coupled to the lifting device includes: determining an operating characteristic of the actuator as the actuator is actuated; determining an operating time of the actuator as the actuator is actuated; determining an accumulated load-time parameter for the actuator based on the operating characteristic and the operating time; comparing the accumulated load-time parameter to a service constant indicative of a structural component of the lifting device requiring service; activating an indicator when the accumulated load-time parameter is greater than the service constant; and servicing a structural component of the lifting device when the indicator is activated.

These and additional features provided by the embodiments of the present invention will be more fully understood in view of the following detailed description, in conjunction with the drawings.

BRIEF DESCRIPTION OF THE DRAWINGS

The embodiments set forth in the drawings are illustrative and exemplary in nature and not intended to limit the inventions defined by the claims. The following detailed description of the illustrative embodiments can be understood when read in conjunction with the following drawings, where like structure is indicated with like reference numerals and in which:

DETAILED DESCRIPTION

Figure 2:
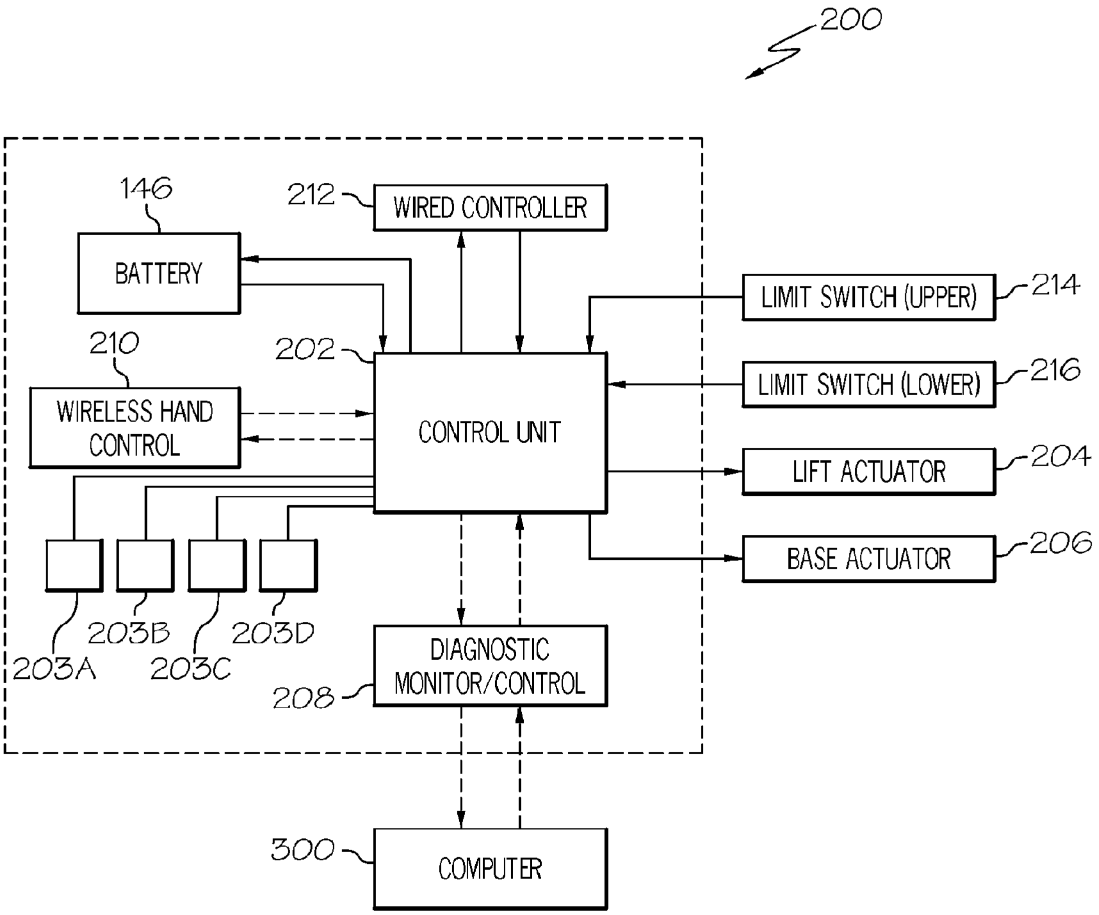
FIG. 2 schematically depicts a block diagram of a lift control system for use in conjunction with a lifting device according to one or more embodiments shown and described herein.
Figure 3:
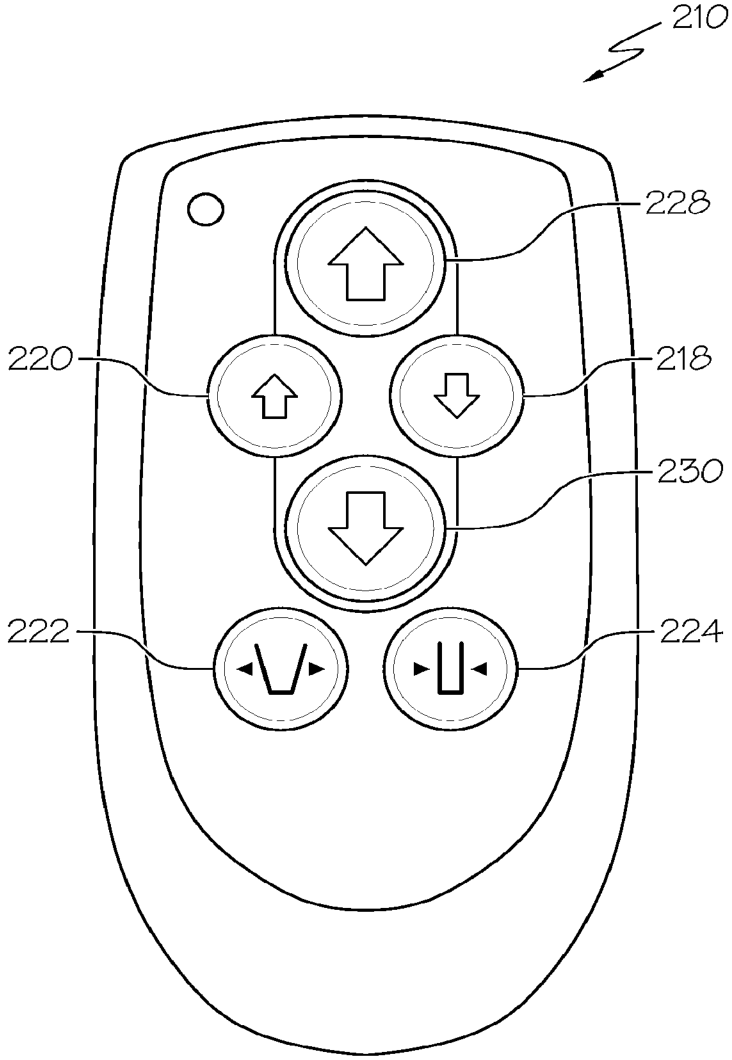
FIG. 3 depicts a wireless controller for use in conjunction with a lift control system according to one or more embodiments shown and described herein.
Figure 4:
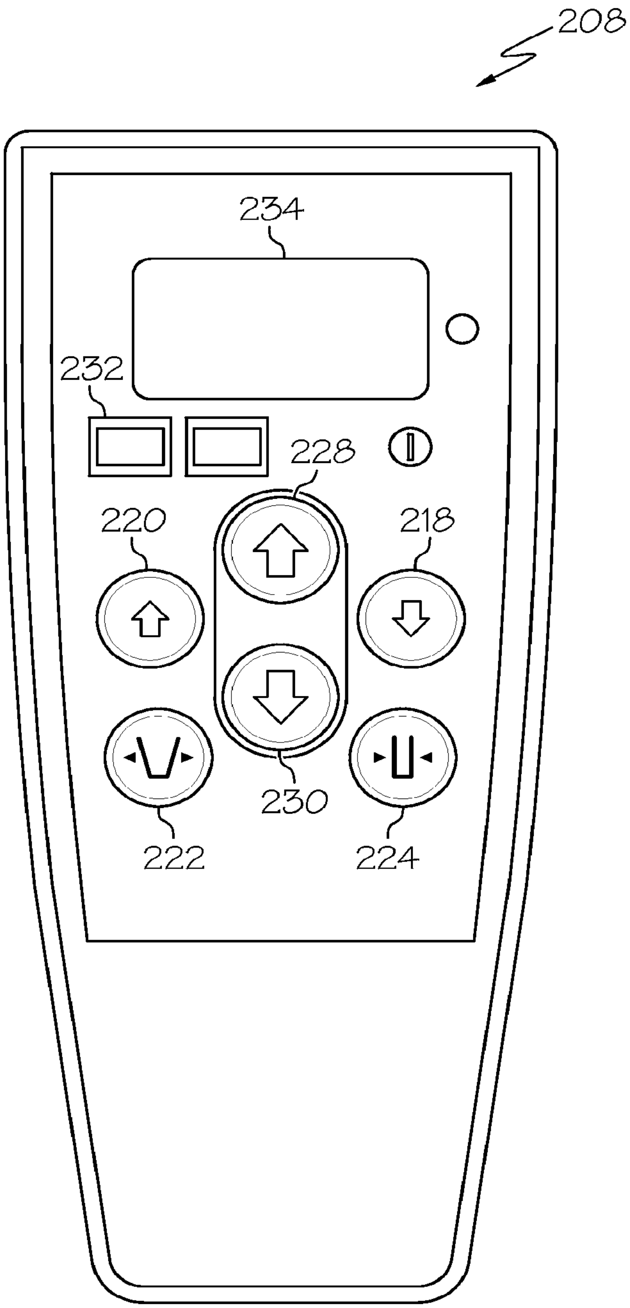
FIG. 4 depicts a wireless diagnostic monitor/controller for use in conjunction with a lift control system according to one or more embodiments shown and described herein.

FIG. 2 generally depicts a schematic embodiment of a lift control system 200 for use in conjunction with a lifting device. The lift control system 200 may generally comprise a control unit 202 electrically coupled to the lift actuator 204 and base actuator 206 of the lifting device. The control unit 202 may be operable to actuate the base and lifting arm of the lifting device by sending control signals to the base actuator 206 and the lift actuator 204, respectively. The control unit 202 may also be operable to determine at least one operating characteristic of the lifting device and an operating time of the lifting device and, based on these values, provide an indication of when a structural component of the lifting device requires service. The lifting device and the lift control system 200 and methods of using the same will be described in more detail herein.

Still referring to FIG. 2, it will be understood that the solid and dashed arrows generally indicate the interconnectivity of various components of the lift control system 200 and lifting device shown and described herein. It should also be understood that the arrows may also be indicative of electrical signals propagated between various components of the lift control system 200 and the lifting device. For example, the arrows may be indicative of a control signal supplied by the control unit 202 to the lift actuator 204 and/or base actuator 206, or a data signal and/or control signal propagated between the wireless hand control 210 and the control unit 202 and/or the diagnostic monitor/control 208 and the control unit 202. Further, it will be understood that the solid arrows are indicative of a wired connection between various components while the dashed lines are indicative of a wireless connection between various components.

Figure 1A:
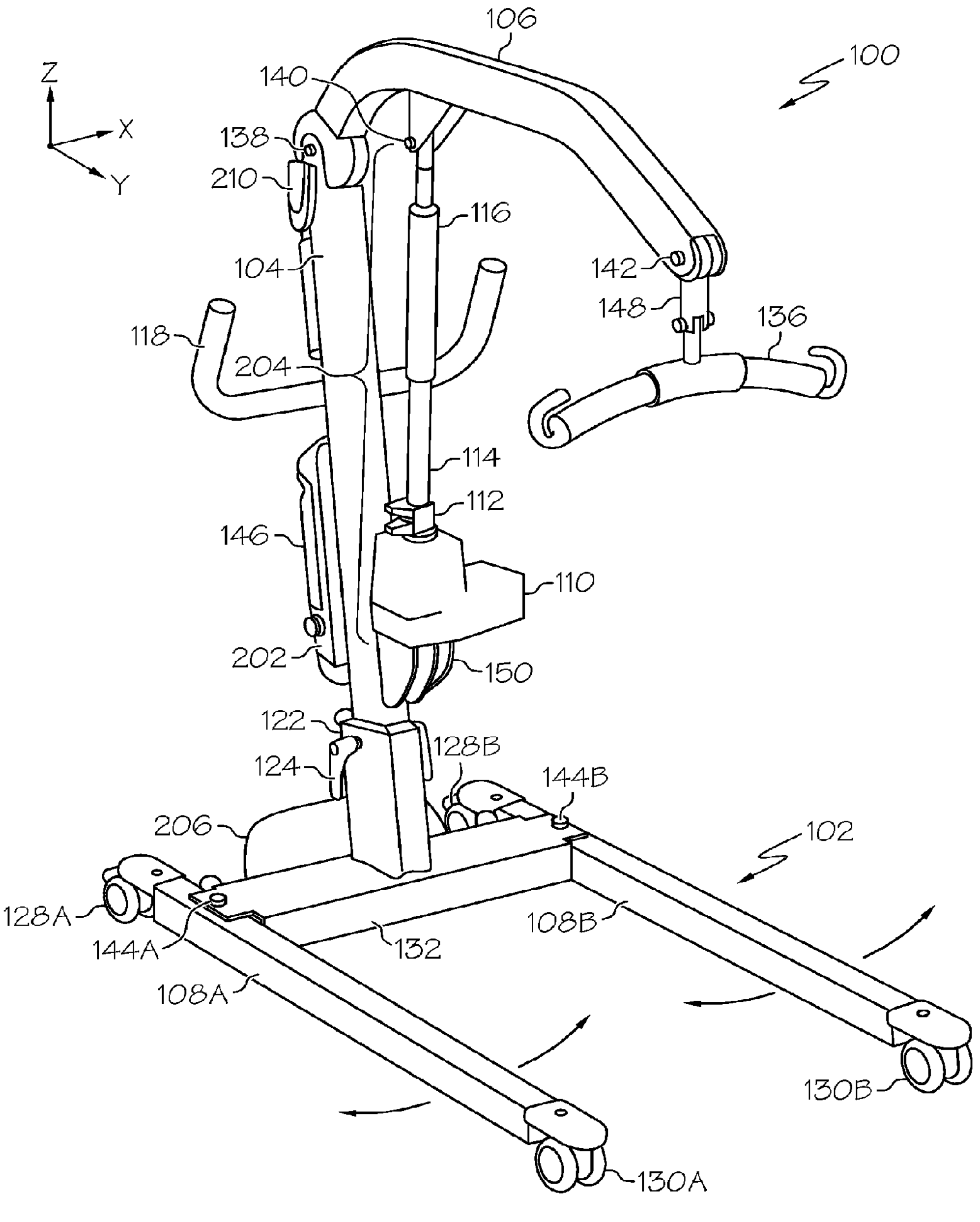
FIGS. 1A and 1B depict a lifting device according to one or more embodiments shown and described herein.
Figure 1B:
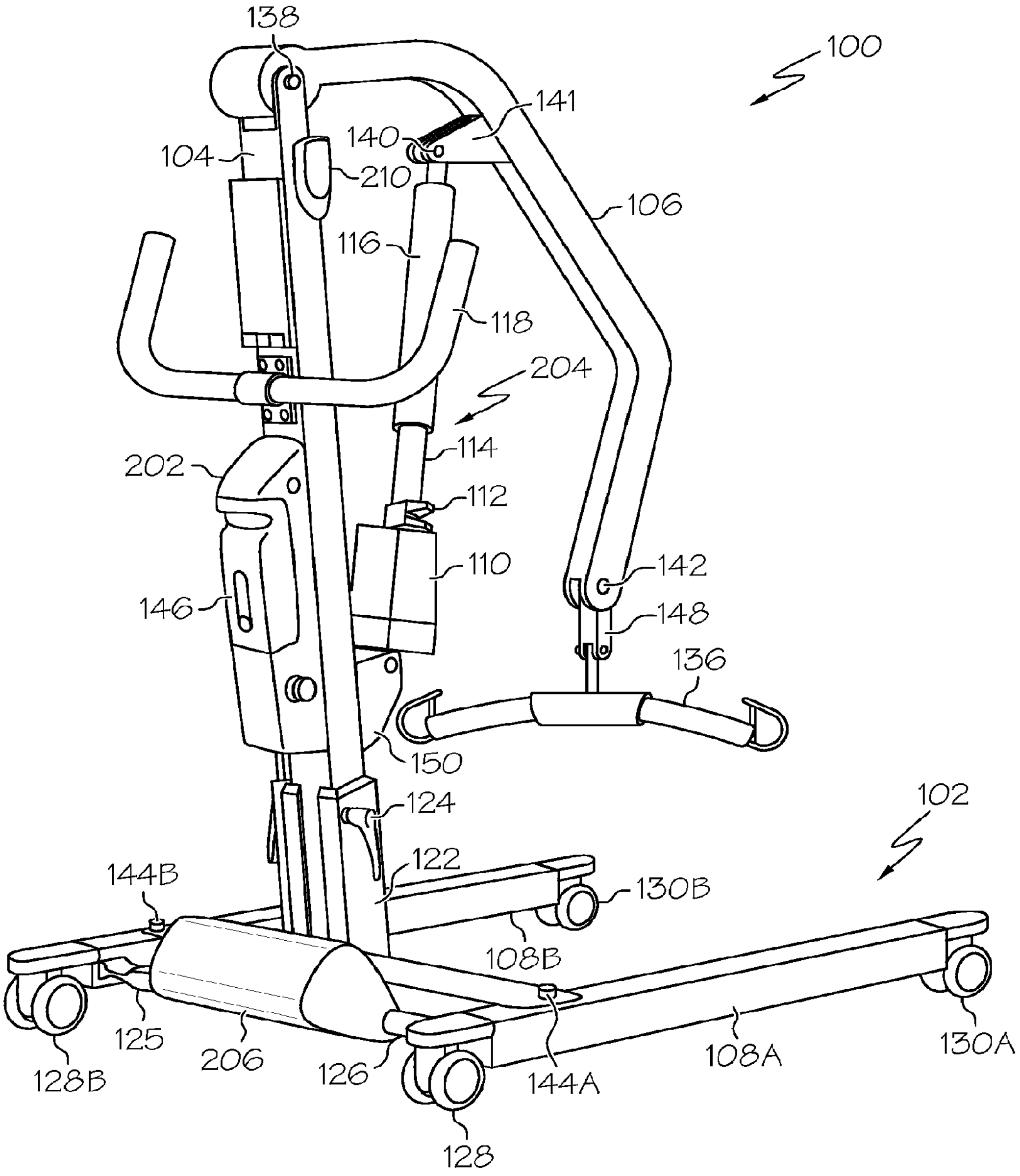

Referring now to FIGS. 1A and 1B, a lifting device 100 according to one or more embodiments of the present invention is schematically illustrated. The lifting device 100 may generally comprise a base 102, a lift mast 104 and a lift arm 106. The base may comprise a pair of base legs 108A,108B which are pivotally attached to a cross support 132 at base leg pivots 144A, 144B such that the base legs 108A, 108B may be pivotally adjusted with respect to the lift mast 104 as indicated by the arrows. The base legs 108A, 108B may be pivoted with the base actuator 206 which is mechanically coupled to both base legs 108A, 108B with base motor linkages 125, 126. In one embodiment, the base actuator 206 may comprise a linear actuator such as a motor mechanically coupled to telescoping threaded rods connected to the bases motor linkages 125, 126 such that, when an armature of the motor is rotated, one of the threaded rods is extended or retracted relative to the other. For example, in the configuration shown in FIG. 1, when the rods are extended, the base legs 108A and 108B are pivoted towards one another and, when the rods are retracted, the base legs 108A and 108B are pivoted away from one another. The base legs 108A, 108B may additionally comprise a pair of front castors 130A, 130B and a pair of rear castors 128A, 128B. The rear castors 128A, 128B may comprise castor brakes (not shown).

In one embodiment, the base 102 may further comprise a mast support 122 disposed on the cross support 132. In one embodiment, the mast support 122 may be a rectangular receptacle configured to receive the lift mast 104 of the lifting device. For example, a first end of the lift mast 104 may be adjustably received in the mast support 122 and secured with a pin, threaded fastener, or a similar fastener coupled to the adjustment handle 124. The pin or threaded fastener extends through the mast support 122 and into a corresponding adjustment hole(s) (not shown) on the lift mast 104. Accordingly, it will be understood that the position of the lift mast 104 may be adjusted vertically (e.g., in the +/−Z direction on the coordinate axes shown in FIG. 1A) with respect to the base 102 by repositioning the lift mast 104 in the mast support 122. The lift mast 104 may further comprise at least one handle 118 coupled to the lift mast 104. The handle 118 may provide an operator with a grip for moving the lifting device 100 on the casters. Accordingly, it will be understood that, in at least one embodiment, the lifting device 100 is mobile.

The lifting device 100 may further comprise a lift arm 106 which is pivotally coupled to the lift mast 104 at the lift arm pivot 138 at a second end of the lift mast such that the lift arm 106 may be pivoted (e.g., raised and lowered) with respect to the base 102. FIG. 1A shows the lift arm 106 in the fully raised position while FIG. 1B shows the lift arm in the fully lowered position. The lift arm 106 may comprise at least one attachment accessory 136 coupled to the lift arm 106 with an attachment coupling 148. In the embodiment shown in FIGS. 1A and 1B the attachment coupling 148 is pivotally attached to the lift arm 106 at an end of the lift arm 106 opposite the lift arm pivot 138. In one embodiment, the attachment coupling 148 is pivotally attached to the lift arm 106 at attachment pivot 142 such that the attachment accessory 136 (a sling bar in the illustrated embodiment) may be pivoted with respect to the lift arm 106. However, it should be understood that, in other embodiments, the attachment coupling 148 may be fixedly attached to the lift arm 106 or that the attachment accessory 136 may be directly coupled to the lift arm 106 without the use of an attachment coupling 148.

In the embodiments described herein, the lifting device 100 is a mechanized lifting device. Accordingly, raising and lowering the lift arm 106 with respect to the base 102 may be achieved using an actuator such as a lift actuator 204. In the embodiments shown, the lift actuator 204 is a linear actuator which comprises a motor 110 mechanically coupled to an actuator arm 114. More specifically, the motor 110 may comprise a rotating armature (not shown) and the actuator arm 114 may comprise one or more threaded rods coupled to the armature such that, when the armature is rotated, the threaded rods are extended or retracted relative to one another and the actuator arm 114 is extended or retracted. In the embodiment shown in FIG. 1, the lift actuator 204 further comprises a support tube 116 disposed over the actuator arm 114. The support tube 116 provides lateral support (e.g., support in the X and/or Y directions) to the actuator arm 114 as the actuator arm 114 is extended.

The lift actuator 204 may further comprise one or more limit switches coupled to the actuator arm 114. For example, the actuator arm 114 may comprise an upper limit switch (not shown) and a lower limit switch (not shown) which are mechanically coupled to the actuator arm 114 and electrically coupled to a control unit 202. The upper limit switch may provide the control unit 202 of the lifting device 100 with an electrical signal indicating that the actuator arm is fully extended (i.e., at an upper end position) while the lower limit switch may provide the control unit 202 with an electrical signal indicating that the actuator arm 114 is fully retracted (i.e., at a lower end position), as will be described in more detail herein.

In the embodiment shown in FIGS. 1A and 1B, the lift actuator 204 is fixedly mounted on the lift mast 104 and pivotally coupled to the lift arm 106. In particular, the lift mast 104 comprises a bracket 150 to which the motor 110 of the lift actuator 204 is attached while the actuator arm 114 is pivotally coupled to the lift arm 106 at the actuator pivot 140. Accordingly, it should be understood that, by actuating the lift actuator 204 with the motor 110, the actuator arm 114 is extended or retracted thereby raising or lowering the lift arm 106 relative to the base 102. In one embodiment, the lift actuator 204 may further comprise an emergency release 112. The emergency release facilitates the manual retraction of the actuator arm 114 in the event of a mechanical or electrical malfunction of the lift actuator 204.

Still referring to FIGS. 1A and 1B, the lifting device 100 may further comprise a control unit 202. The control unit 202 may comprise a battery 146 and may be electrically coupled to the lift actuator 204 and the base actuator 206 and also to the upper limit switch (not shown) and the lower limit switch (not shown). The control unit 202 may be operable to receive an input from an operator via a control device coupled to the control unit 202. The control device may comprise a wired controller and/or one or more wireless controllers. For example, in one embodiment, the control device may be a wired controller or, alternatively, a controller integrated into the control unit 202. In another embodiment, the controller may be a wireless controller such as a wireless hand control and/or a wireless diagnostic monitor/control. Based on the input received from the control device, the control unit is programmed to adjust the position of the lift arm 106 and/or the position of the base legs 108A, 108B by sending electric control signals to the lift actuator 204 and/or the base actuator 206. Further, as will be described in more detail herein, the control unit 202 may also be incorporated into a lift control system for the lifting device 100. The lift control system may be used to monitor lift performance and determine when service on the lifting device is required and when use of the lifting device 100 should be discontinued.

It should be understood that, the term "service," as used herein, refers to the inspection, maintenance or replacement of a structural component of the lifting device or an electrical component of the lifting device. Further, it should also be understood that the phrase "structural component" refers to the mechanical and structural components of the lifting device including, without limitation, the lift arm, the mast support, the lift mast, the base, the cross support, the base leg, the base leg pivot, the front castors, the rear castors, the castor brakes, the lift mast adjustment handle and associated fastener, the lift arm pivot, the actuator pivot, the attachment coupling, the attachment pivot, the bracket of the lift mast and/or combinations thereof. It should also be understood that the phrase "electrical component" refers to the lift actuator, the base actuator, the various components of the lift control system, and/or various components thereof.

While the embodiments described herein refer to the lift actuator 204 as comprising a motor 110 and an actuator arm 114, it will be understood that the actuator may have various other configurations and may include a hydraulic or pneumatic actuator comprising a mechanical pump or compressor or a similar type of actuator. Further, in other embodiments, where the lifting device is a cable-based lift system, the actuator may be a motor which pays out and/or takes-up cable thereby raising and/or lowering an attached load. Accordingly, it will be understood that various other types of actuators may be used to facilitate raising and lowering the lift arm and/or an attached load with respect to the base 102.

Moreover, while FIGS. 1A and 1B depict the lifting device 100 as a mobile patient lift, it should be understood that the lift control systems described herein may be used in conjunction with other lifting devices having various other configurations including, without limitation, stationary lifting devices and overhead lifting devices. Further, it should also be understood that, while specific embodiments of the lifting device described herein relate to lifting devices used for raising and/or lowering patients, the lift control systems described herein may be used with any lifting device which is operable to raise and lower a load.

The lift control system 200 of the lifting device 100 will now be described in more detail with reference to FIGS. 1-4.

Referring now to FIG. 2, a block diagram of a lift control system 200 for use in conjunction with the lifting device 100 shown in FIGS. 1A and 1B is schematically depicted according to one or more embodiments shown and described herein. The lift control system 200 may generally comprise a control unit 202, and a control device such as, for example, a wired controller 212 and/or a wireless controller, such as a wireless hand control 210 and/or a wireless diagnostic monitor/control 208. In one embodiment, the lift control system 200 may also include the battery 146 and/or one or more indicators. In the embodiment shown in FIG. 2, the lift control system 200 comprises four indicators 203A-203D.

The control unit 202 may generally comprise a central processing unit ("CPU") and associated electrical components, including, without limitation, a processor (not shown) and at least one memory (not shown). The memory includes a set of computer readable and executable instructions which the processor executes to control the lifting device. Utilizing the computer readable and executable instructions, the control unit 202 is operable to output a control signal to the lift actuator 204 and/or the base actuator 206 based on input signals received from the wireless hand control 210, the wired controller 212, and/or the diagnostic monitor/control 208.

The one or more indicators provide an operator of the lifting device 100 with an indication of the status of various components and/or systems of the lifting device. In one embodiment, the at least one indicator comprises a visual indicator such as an LED or similar lamp capable of providing an operator with a visual indication. Alternatively, the at least one indicator may comprise an audible indicator, such as a speaker or similar device capable of producing an audible signal.

In one embodiment, the first indicator 203A may be indicative of the control unit communicating with a wireless controller, such as the wireless hand control 210 or the diagnostic monitor/control 208. When the indicator is activated, the control unit 202 is receiving a signal from the wireless controller and/or sending a signal to the wireless controller.

The second indicator 203B may be indicative of an overload condition in the lift actuator, such as when the load on the lifting device 100 exceeds a pre-programmed load limit, as will be described in more detail herein.

The third indicator lamp may be indicative of the lifting device 100 requiring service. As described further herein, the service interval may be based on time and/or usage of the lifting device and constant values may be pre-programmed in the control unit such that, when the lifting device exceeds the pre-programmed limit, the service indicator is activated.

The fourth indicator 203D may be indicative of the Expected Life Time (ELT) of the lifting device. For example, the lifting device 100 may have a predetermined life expectancy based on time and/or usage and, when this value is approached and/or exceeded, the control unit activates the indicator.

The control unit 202 may further comprise at least one port for sending and/or receiving signals from other devices in the lift control system 200. For example, in one embodiment, the control unit 202 comprises at least one transceiver, such as an infrared (IR) transceiver or a radio frequency (RF) transceiver, which may be utilized by the control unit 202 to send data signals to other components in the lift control system 200. In the embodiments shown and described herein, the control unit 202 of the lift control system 200 comprises an IR transceiver which is operable to send data signals to and receive data signals from the diagnostic monitor/control 208 and/or the wireless hand control 210.

As described herein, the control unit 202 may be coupled to a control device such as wired controller 212, wireless hand control 210, and/or diagnostic monitor/control 208. The wired controller 212 may be integral with the control unit 202 while, in other embodiments, the wired controller 212 may be coupled to the control unit 202 with a cable. In the embodiments shown and described herein, the wired controller 212 is integral with the control unit 202. The wireless hand control 210 and the diagnostic monitor/control 208 include IR or RF transceivers such that the wireless hand control 210 and/or the diagnostic monitor/control 208 are operable to send signals to, and receive signals from, the control unit 202.

Each of the wired controller 212, the wireless hand control 210 and the diagnostic monitor/control 208 comprise user input controls located on the control device which may be used to control the lifting device. For example, referring to the wireless hand control 210 depicted in FIG. 3 and the diagnostic monitor/control 208 depicted in FIG. 4, each of the control devices comprise user input controls, such as buttons 218-230, which may be used to operate the lifting device 100. The user input controls may include buttons 228, 230 (designated by large up and down arrows) which may be used to rapidly raise and lower the lift arm 106 of the lifting device 100, buttons 218, 220 (designated by small arrows) which may be used to more slowly raise and lower the lift arm 106 of the lifting device, and buttons 222, 224 (with designations resembling a "V" and a "U") which may be used to pivot the base legs 108A, 108B relative to the lift mast 104. While specific reference has been made herein to the wireless hand control 210 and the diagnostic monitor/control 208, it should be understood that the wired controller 212 contains similar user input controls.

Still referring to FIG. 2, the control unit 202 may also comprise one or more ports for communicatively connecting the control unit 202 to an external computer 300 or computer system to facilitate downloading data from the control unit 202, uploading data to the control unit 202, and/or reprogramming the control unit 202. For example, the control unit may comprise a USB port, an RS-232 port, an IR port or a similar port to facilitate directly coupling the control unit 202 to a computer 300 or computer system. In this embodiment, the processor of the control unit 202 executes the computer readable and executable instruction set stored in the memory to upload at least one operating characteristic of the lifting device and/or at least one accumulated operating parameter to the external computer system. The phrase "operating characteristic," as used herein, includes, without limitation, a load applied to the lift arm, a current supplied to the actuator, an operation time of the lifting device, a current discharged from the battery of the lift control system, a power discharged from a battery of the lift control system or combinations thereof. The phrase "accumulated operating parameter," as used herein, includes, without limitation, an accumulated number of initiated battery charging events, an accumulated number of incomplete battery charging events, an accumulated number of battery replacements, an accumulated load-time parameter, an accumulated current-time parameter, an accumulated power-time parameter, an accumulated number of upper end positions of the lift actuator, an accumulated number of lower end positions of the lift actuator, an accumulated number of overload stops of the lifting device, an average current consumption of the lifting device, an accumulated operating time of the lifting device, an accumulated operating time of the lifting device, an accumulated number of starts of the lifting device, or combinations thereof. The processor of the control unit 202 also executes the computer readable and executable instruction set stored in the memory to download service constants and/or operational parameters of the lifting device from the external computer system when the lift control system is communicatively coupled to the external computer system.

In the embodiments where the control unit comprises a battery 146, as depicted in FIG. 2, the control unit 202 also comprises circuitry to charge the battery when the lifting device, specifically the lift control system 200 of the lifting device, is coupled to a voltage source (i.e., when the lift control system is plugged in to a wall outlet or other source for supplying power to the lift control system). In one embodiment, the memory of the control unit 202 also comprises computer readable and executable instructions for monitoring an accumulated number of initiated battery charging events, an accumulated number of completed battery charging events and an accumulated number of incomplete battery charging events and storing each of these quantities in the memory of the control unit 202. The control unit 202 also comprises circuitry and the memory of the control unit comprises corresponding computer readable and executable instructions for monitoring when the battery 146 has been replaced and storing the time of replacement and the accumulated number of battery replacements in the memory.

In the embodiments described herein, the control unit 202 also comprises circuitry and the memory of the control unit comprises corresponding computer readable and executable instructions for regulating and measuring the current supplied to the lift actuator 204 and the base actuator 206 by the lift control system 200. For example, the control unit 202 may contain circuitry which functions as an ammeter for monitoring the magnitude of the current supplied to either the lift actuator 204 or the base actuator 206. The control unit 202 may monitor the magnitude of the current and store the value of the supplied current in the memory of the control unit. In one embodiment, the memory of the control unit comprises computer readable and executable instructions for monitoring the power and/or current discharged by the battery and storing these values in memory. The control unit 202 may also be programmed to determine the average current consumption of the lifting device over a specified interval and store the value in memory.

The control unit 202 may also comprise computer readable and executable instructions for monitoring and/or preventing overload conditions during operation of the lift. For example, the control unit 202 may be programmed to monitor the current supplied to the lift actuator 204 when the lifting device is actuated with the control device as described above. The control unit 202 compares the current supplied to the lift actuator 204 to a predetermined current threshold value stored in the memory of the control unit. When the current supplied to the lift actuator 204 exceeds the current threshold value, the control unit 202 discontinues the current supplied to the lift actuator, thereby stopping the lifting device, and provides an indication, such as with indicator 203B, that the current supplied to the lift actuator has exceeded the current threshold value. The control unit may also be programmed to store the accumulated number of overload stops in the memory of the control unit.

The control unit 202 of the lift control system 200 may also comprise computer readable and executable instructions for timing various parameters relating to the operation of the lifting device and storing such parameters in the memory of the control unit 202. In one embodiment, the control unit 202 may comprise computer readable and executable instructions for storing the number of times the lifting device is started. For example, the control unit 202 logs a starting event each time the lifting device is started and continuously operated for a predetermined time period. The control unit 202 maintains a count of the accumulated number of starts in the memory of the control unit. Similarly, the control unit also maintains the accumulated operating time of the lifting device in the memory of the control unit. In one embodiment, the control unit maintains the total accumulated operating time of the lifting device as accrued over the entire lifetime of the lifting device and/or the periodically accumulated operating time of the lifting device as accrued between consecutive service events. The control unit 202 may also be programmed to monitor the elapsed calendar time between service events in addition to the total number of service events performed.

In another embodiment, the control unit 202 is programmed with computer readable and executable instructions for receiving and processing input signals from one or more sensors, such as the upper limit switch 214 and the lower limit switch 216. When the actuator arm 114 is fully extended (e.g., when the actuator arm has reached its maximum amount of travel), the upper limit switch 214 is triggered which, in turn, sends a signal to the control unit 202 indicating that the actuator arm 114 is fully extended and has reached an upper end position. The control unit 202 tracks each time the upper limit switch 214 is actuated (i.e., the number of upper end positions) and stores the accumulated number of upper end positions in memory. Similarly, when the actuator arm 114 is fully retracted, the lower limit switch 216 is triggered which, in turn, sends a signal to the control unit 202 indicating that the actuator arm 114 is fully retracted has reached a lower end positions. The control unit 202 tracks each time the lower limit switch 216 is actuated and stores the accumulated number of lower end positions in memory. Accordingly, based on the signals provided by the upper limit switch 214 and the lower limit switch 216, the control unit 202 determines when the actuator arm 114 has reached either extreme of its range of travel (e.g., fully extended or fully retracted).

Alternatively or additionally, the control unit 202 is programmed with computer readable and executable instructions for receiving and processing input signals from a load sensor (not shown) mechanically coupled to the lift arm of the lifting device. The load sensor may comprise a load cell, a linear varying displacement transducer (LVDT) or a similar sensor operable to detect a load applied to the lift arm of the lifting device and output an electrical signal indicative of that load to the control unit. The control unit 202 is programmed to determine the load applied to the lift arm based on the signal received from the load sensor and track the time that the load is applied to the lift arm.

The computer readable and executable instructions stored in the memory of the control unit 202 of the lift control system 200 may be executed by the processor to determine when a structural component of the lifting device or an electrical component of the lifting device is in need of service. More specifically, the lift control system 200 may be operable to determine when structural components and/or electrical components of the lifting device are in need of inspection and maintenance, when structural components and/or electrical components of the lifting device are in need of replacement, and/or when the lifting device has reached the end of its usable life. The operation of the lifting device 100 and the lift control system 200 of the lifting device for determining when the lifting device is in need of service will be described in more detail with respect to FIGS. 1A, 1B and 2.

Referring to FIGS. 1A, 1B and 2, when the lifting device 100 is actuated with one of the control devices, the lift control system 200 outputs a control signal from the control unit 202 to the lift actuator 204 which actuates the lift actuator 204 thereby causing the lift arm 106 to be raised or lowered with respect to the base 102. As the lift arm 106 is raised or lowered, the control unit 202 determines the operating time of the lifting device 100 and stores the operating time of the lifting device 100 in the memory of the control unit 202. At the same time the control unit 202 also determines at least one operating characteristic of the lifting device 100 while the lift arm 106 is being raised or lowered and stores this operating characteristic in the memory of the control unit 202. The operating characteristic may include a load applied to the lift arm 106, a current supplied to the lift actuator 204, an operation time of the lifting device 100, a current discharged from the battery 146 of the lift control system 200, or a power discharged from a battery 146 of the lift control system 200, as described hereinabove. For example, in one embodiment described herein, the operating characteristic is the current supplied to the lift actuator 204 as the lift arm 106 is raised or lowered, the power discharged by the battery 146 as the lift arm 106 is raised or lowered, or the current discharged by the battery 146 as the lift arm 106 is raised or lowered. More specifically, the current of the control signal varies with the load (i.e., the mass) applied to the lift actuator 204 via the lift arm 106. For example, when a load is present on the attachment accessory 136, such as when a sling or other device attached to the attachment accessory 136 contains a patient, the current supplied to the lift actuator 204 to raise the lift arm 106 may be greater than when no load is present on the lift arm 106. Accordingly, it will be understood that the current supplied to the lift actuator 204 may be in direct proportion to the weight or load that the lift arm 106 and lifting device 100 are subjected to and, as such, the current supplied to the lift actuator 204 may be used as an indicator of the weight or load on the lifting device 100. The current supplied to the lift actuator 204 may be determined based on the current supplied to the lift actuator 204 during actuation of the lifting device 100, the power discharged in the battery 146 during actuation of the lifting device 100, or the current discharged by the battery 146 during actuation of the lifting device 100. The current and/or power may be stored in the memory of the control unit 202.

In an alternative embodiment, the at least one operating characteristic is the load applied to the lift arm 106 as measured by the load sensor mechanically coupled to the lift arm 106. In this embodiment, the load sensor outputs a signal indicative of the load applied to the control unit 202 which stores the value in memory.

After the at least one operating characteristic and the operating time have been determined and stored in the memory of the lifting device 100, the control unit 202 determines an accumulated operating time for the lifting device by adding the determined valued for the operating time to the previously accumulated operating time of the lifting device and storing the accumulated operating time of the lifting device in the memory of the control unit. The accumulated operating time may be the operating time accumulated since the last service event (i.e., a periodically accumulated operating time) and/or the operating time accumulated over the entire life of the lifting device (i.e., a total accumulated operating time).

An accumulated load-time parameter of the lifting device is also determined based on the at least one operating characteristic and the operating time of the lifting device. For example, the determined operating characteristic may be the load applied to the lift arm 106 and the load-time parameter is determined by multiplying the load by the time of operation of the lifting device and adding the product to a previously determined accumulated load-time parameter stored in the memory of the control unit. Alternatively, the operating characteristic may be the current supplied to the lift actuator 204 as the lift arm 106 is raised or lowered, the power discharged by the battery 146 as the lift arm 106 is raised or lowered, or the current discharged by the battery 146 as the lift arm is raised or lowered. In this embodiment, the accumulated load-time parameter is determined by multiplying the current or power by the operating time of the lifting device and adding the product to a previously determined accumulated load-time parameter stored in the memory of the control unit. The newly determined accumulated load-time parameter is then stored in the memory of the control unit. The accumulated load-time parameter may be a periodically accumulated load-time parameter (i.e., the load-time parameter accrued since the last service event) and/or the accumulated load-time parameter (i.e., the load-time parameter accrued over the entire life of the lifting device).

In one embodiment, after the accumulated operating parameter is determined, the lift control system compares the accumulated operating parameter to a predetermined service constant stored in the memory of the lifting device to determine if a structural component of the lifting device is in need of service. In one embodiment, the comparison between the accumulated operating parameter and the service constant is utilized to determine if a structural component of the lifting device requires inspection or maintenance. In this embodiment, the accumulated operating parameter is a periodically accumulated operating parameter and the service constant is a service load-time interval. For example, the service load-time interval may be a predetermined load-time value which is indicative of when structural components of the lifting device need service. If the service load-time interval is greater than the periodically accumulated operating parameter, no inspection or maintenance is needed. However, if the service-load time interval is less than or equal to the periodically accumulated operating parameter, inspection and maintenance of at least one structural component of the lifting device is required and the control unit 202 activates the third indicator lamp 203C (i.e., the maintenance indicator) thereby indicating to a user that the lift is in need of inspection and/or maintenance.

The comparison between the accumulated operating parameter and the service constant may also be utilized to determine if a structural component of the lifting device needs to be replaced. In this embodiment, the accumulated operating parameter is a total accumulated load-time interval and the service constant is indicative of a replacement load-time interval of at least one structural component of the lifting device. For example, each structural component of the lifting device may have an associated replacement load-time interval which generally corresponds to a predetermined percentage of the useable service life of the structural component. If the replacement load-time interval is greater than the total accumulated operating parameter, none of the structural components of the lifting device need to be replaced. However, if the replacement load-time interval is less than or equal to the total accumulated operating parameter of the lifting device at least one structural component of the lifting device requires replacement and the control unit 202 activates the third indicator 203C (i.e., the maintenance indicator) thereby indicating to a user that at least one structural component of the lifting device is in need of inspection and/or maintenance. To differentiate from the embodiment described above wherein illumination of the maintenance indicator lamp indicates the need for inspection and maintenance of a structural component of the lifting device, the control unit may activate the indicator differently for each set of circumstances. For instance, where the indicator is an LED, the indicator may be activated to flash when a structural component of the lifting device is in need of service or maintenance and the indicator may be constantly illuminated when one or more structural components of the lifting device are in need of service.

The comparison between the accumulated operating parameter and the service constant may also be utilized to determine if the lifting device has reached the end of its usable service life. In this embodiment, the accumulated operating parameter is a total accumulated load-time interval and the service constant is indicative of a usable service life of the lifting device. For example, the lifting device 100 may have a predetermined service life and the usable service life may be indicative of a predetermined percentage of the service life. If the usable service life is greater than the total accumulated operating parameter, the lifting device 100 may remain in operation. However, when the total accumulated operating parameter reaches a predetermined percentage of the usable service life, the lift control system 200 of the lifting device may activate the fourth indicator 203D. For example, when the fourth indicator is an LED, the lift control system 200 may cause the fourth indicator to flash indicating that the total accumulated operating parameter has reached a predetermined percentage of the usable service life of the lifting device 100. When the total accumulated operating parameter is greater than or equal to the usable service life, the lift control system 200 of the lifting device activates the fourth indicator 203D. For example, when the fourth indicator is an LED, the lift control system 200 causes the fourth indicator 403 to remain illuminated indicating that the total accumulated operating parameter has reached and/or exceeded the usable service life of the lifting device 100 and that use of the lifting device should be discontinued. Additionally, when the total accumulated operating parameter is greater than or equal to the usable service life, the lift control system 200 of the lifting device may prevent further operation of the control device.

While specific embodiments described herein relate to the inspection, maintenance and/or replacement of lift structural components, it should be understood that similar procedures may be used in conjunction with service constants related to the use of electrical components of the lift to determine when the electrical components of the lift require inspection, maintenance and/or replacement.

In addition to comparing the accumulated operating parameter to the service constant to determine when the lifting device is in need of service, the lift control system also compares the periodically accumulated operating time of the lifting device to an operating time service constant. The operating time service constant is indicative of a maximum time period between service intervals. If the periodically accumulated operating time of the lifting device is greater than or equal to the operating time service constant, the lifting device is in need of service and the lift control system 200 illuminates the third indicator 203C. Where the third indicator 203C is an LED, as described above, the third indicator 203C may be made to flash in a particular pattern to indicate that the periodically accumulated operating time has exceeded the operating time service constant.

When the third indicator 203C is activated, the lifting device 100 may be serviced by a technician who performs the required inspection, maintenance and/or replacement of structural components as needed. Where the fourth indicator 203D is activated, the lifting device 100 may also be serviced. However, when the fourth indicator 203D is activated, the service may be more extensive and may include a complete overhaul or refurbishment of the lifting device. Regardless of the type of service performed, the date of the service event may be entered into the memory of the control unit and the control unit may update the total accumulated number of service events that have been performed on the lifting device. Additionally, the type of service performed as well as an indication of any structural components that have been repaired and/or replaced may also be saved in the memory of the control unit. Accordingly, it should be understood that a service record may be saved in the memory of the lift control system of the lifting device and that service record accompanies the lifting device throughout its lifetime.

As described hereinabove, the lift control system 200 of the lifting device 100 may comprise a wireless diagnostic monitor/control 208. In addition to providing user inputs to control the functionality of the lifting device, the diagnostic monitor/control 208 may comprise a processor and a memory having computer readable and executable instructions which enable the diagnostic monitor/control to be utilized as a diagnostic tool for servicing and maintaining the lifting device 100. In one embodiment the diagnostic monitor/control 208 is programmed to send data to and receive data from the control unit 202. For example, the data sent to the control unit comprises at least one operational parameter (i.e., the current threshold limit or a similar parameter) and/or at least one service constant such as, for example, the service time interval, the replacement interval of at least one structural component and/or the usable service life of the lifting device. The operational parameters and/or service constant may be stored in a memory operatively associated with the control unit 202. The data received by the diagnostic monitor/controller from the control unit 202 comprises at least one operating characteristic and/or an accumulated operating parameter of the lifting device. The operating characteristic and/or accumulated operating parameter is stored in a memory operatively associated with the diagnostic monitor/control 208. An operator or service technician may retrieve the at least one operating characteristic and/or accumulated operating parameter from the diagnostic monitor/control 208 and/or otherwise review the at least one operating parameter and/or accumulated operating parameter on the display 234 of the diagnostic monitor/control 208.

Further, the computer readable and executable instruction set stored in the diagnostic monitor/control 208 may be executed by the processor of the diagnostic monitor/control 208 to reset various service and/or life parameters stored in the controller. For example, when the service indicator (i.e., the third indicator described above) is illuminated, thereby indicating that the lifting device 100 requires service, the diagnostic monitor/control 208 may be used to reset the service lamp and restart the service interval. Further, when the ELT indicator (i.e., the fourth indicator described above) is illuminated, thereby indicating that the lifting device 100 has reached or is approaching the predetermined service life expectancy, the diagnostic monitor/control 208 may be operable to reset the service ELT indicator and restart the ELT counter following refurbishment of the lifting device. Accordingly, it will be understood that the diagnostic monitor/control 208 may be used reset various parameters associated with the operation and maintenance of the lifting device.

In another embodiment, the computer readable and executable instruction set stored in the memory of the control unit 202 and/or in the diagnostic monitor/control 208 may be executed to upload at least one accumulated operating parameter and/or the operating characteristic to a computer 300, network, or other, similar data storage device, where the at least one accumulated operating parameter and/or the operational characteristic are stored in a history file unique to the specific lifting device 100. For example, in one embodiment, the history file is correlated to the serial number of the lifting device and/or the identification number of the controller which is stored in the memory of the control unit 202. In one embodiment, the history file may be accessed remotely, such as over an internet or similar network connection, and an operator or technician may utilize the data stored in the history file to perform diagnostics on the particular lifting device 100. For example, the at least one accumulated operating parameter and/or the operational characteristic may be analyzed to determined if the lifting equipment is suitable for the conditions of use (e.g., loads, height of lifts, total power consumption, etc.) under which the lift is being used. For example, if the history file of the lifting device indicates that the number of upper end positions is abnormally high, the lifting device may not have the desired vertical range of motion. Accordingly, the lift mast 104 of the lifting device 100 may need to be raised. Similarly, if the number of overload stops is high, the lifting device 100 may not be suitable for the loads being applied to the lifting device 100 and an alternative lifting device and/or actuator may be recommended. Further, the history file may be utilized to determine if the lifting device 100 is being properly used by reviewing the number of overloads, the charging history, the number of batteries used, the total number of starts and actuator drive time as well as the total actuator drive time and calendar time since the last reset. The history file may also be utilized to track the lift through service records which may be associated with the serial number of the lifting device 100. In addition, the history file may also be used to determine if either the structural components or the electrical components are in need of service and/or replacement.

In addition to functioning as a controller for the lifting device 100 and/or a diagnostic tool for maintaining the lifting device 100, the diagnostic monitor/control may also be used to instantaneously access operating data stored in the control unit 202 of the lifting device. For example, the diagnostic monitor/control 208 may also be operable to accumulated operating parameters stored in the memory of the control unit. Such information may be instantaneously available to a technician or salesperson to determine if the lifting device is in need of service, requires spare or replacement parts, or if a different model of lifting device may be more suitable for the operator's needs.

It should now be understood that the lift control system shown and described herein may be used in conjunction with a lifting device to assess the suitability of the equipment for use in conjunction with the specific operational conditions as well as to determine the proper maintenance and repair intervals for the lifting device. Further, the lift control system shown and described herein provides a system by which operating and service parameters may be easily and readily accessed and tracked throughout the life of the lifting device.

It should also be understood that the use of a periodically accumulated load-time parameter facilitates servicing the lifting device according to usage rather than servicing the lifting device according to time. For example, lifting devices which are used more frequently will be serviced more often than lifting devices that are used less frequently. Accordingly, use of the periodically accumulated load-time parameter to determine when the lifting device needs to be serviced permits flexibility in servicing the lifting device and allows the lifting device to be serviced as needed rather than according to a rigid maintenance schedule. This may result in reduced device down time due to preventative maintenance in cases where the lifting device is frequently used and reduced maintenance costs where devices are used less frequently.

While the specific embodiments described herein relate to a mobile lifting device comprising an actuator and a lift arm, it should be understood that the basic principle of operation of the lift control system may be applied to lifting devices having various other configurations.

While particular embodiments and aspects of the present invention have been illustrated and described herein, various other changes and modifications can be made without departing from the spirit and scope of the invention. Moreover, although various inventive aspects have been described herein, such aspects need not be utilized in combination. It is therefore intended that the appended claims cover all such changes and modifications that are within the scope of this invention.

What is claimed is:

1. A lift control system for operating a lifting device comprising a lift actuator coupled to a lift arm, the lift control system comprising:
- a control unit comprising a processor with a memory communicatively coupled to the processor and having computer readable and executable instructions, wherein the processor executes the computer readable and executable instructions to:
  - determine at least one operating characteristic of the lifting device and an operating time of the lifting device as the lifting device is actuated;
  - determine an accumulated load-time parameter for the lifting device based on the at least one operating characteristic and the operating time;
  - compare the accumulated load-time parameter to a service constant; and
  - provide an indication that a lift structural component or a lift electrical component requires service based on the comparison of the accumulated load-time parameter to the service constant.

2. The lift control system of claim 1 wherein the accumulated load-time parameter is a periodically accumulated load-time parameter and the service constant is indicative of a service load-time interval.

3. The lift control system of claim 1 wherein the accumulated load-time parameter is a total accumulated load-time parameter and the service constant is indicative of a replacement load-time interval of at least one of the lift structural component or the lift electrical component.

4. The lift control system of claim 1 wherein the accumulated load-time parameter is a total accumulated load-time parameter and the service constant is indicative of a usable service life of the lifting device.

5. The lift control system of claim 1 wherein the processor further executes the computer readable and executable instructions to:
- monitor a current supplied to the lift actuator when the lifting device is actuated;
- discontinue the current supplied to the lift actuator when the current exceeds a current threshold value;
- provide an indication with an indicator that the current supplied to the lift actuator has exceeded the current threshold value; and
- determine an accumulated number of overload stops based on the current supplied to the lift actuator.

6. The lift control system of claim 1 further comprising a wireless controller communicatively coupled to the control unit; and
- the processor executes the computer readable and executable instructions to upload at least one operating characteristic of the lifting device to the wireless controller.

7. The lift control system of claim 6 wherein:
- the wireless controller comprises a processor and a memory having computer readable and executable instructions; and
- the processor of the wireless controller executes the computer readable and executable instructions of the wireless controller to download the service constant and at least one lift operational parameter to the memory of the control unit of the lift control system.

8. A lifting device for raising and lowering a payload coupled to the lifting device, the lifting device comprising:
- a lift mast mechanically coupled to a base at a first end of the lift mast, wherein the base comprises a pair of base legs pivotally attached to a cross support such that the pair of base legs are pivotable with respect to the lift mast;
- a lift arm pivotally coupled to the lift mast at a second end of the lift mast;
- a lift actuator mechanically coupled to the lift mast and the lift arm, wherein actuation of the lift actuator raises or lowers the lift arm relative to the base;
- a base actuator mechanically coupled to the base legs, wherein actuation of the base actuator pivots the base legs with respect to the lift mast;
- a lift control system communicatively coupled to the lift actuator and the base actuator, the lift control system comprising:

a control unit comprising a processor and a memory having computer readable and executable instructions, wherein the processor executes the computer readable and executable instructions to:

determine at least one operating characteristic of the lifting device and an operating time of the lifting device as the lifting device is actuated;

determine an accumulated load-time parameter for the lifting device based on the at least one operating characteristic and the operating time;

compare the accumulated load-time parameter to a service constant; and provide an indication that a lift structural component or a lift electrical component requires service based on the comparison of the accumulated load-time parameter to the service constant.

9. The lifting device of claim 8 wherein the accumulated load-time parameter is a periodically accumulated load-time parameter and the service constant is indicative of a service load-time interval.

10. The lifting device of claim 8 wherein the accumulated load-time parameter is a total accumulated load-time parameter and the service constant is indicative of a replacement load-time interval of the lift structural component or the lift electrical component.

11. The lifting device of claim 8 wherein the accumulated load-time parameter is a total accumulated load-time parameter and the service constant is indicative of a usable service life of the lifting device.

12. The lifting device of claim 11, wherein the lift control system prevents operation of the lift control device when the total accumulated load-time parameter is greater than or equal to the usable service life of the lifting device.

13. The lifting device of claim 8 wherein:

the lift structural component is selected from the group consisting of the lift arm, a mast support, the lift mast, the base, a cross support, a base leg, a base leg pivot, front castors, rear castors, castor brakes, an adjustment handle and fastener, a lift arm pivot, an actuator pivot, an attachment coupling, an attachment pivot, a bracket of the lift mast or combinations thereof; and the lift electrical component is at least one of the lift actuator and the base actuator.

14. The lifting device of claim 8 wherein the at least one operating characteristic is selected from the group consisting of a load applied to the lift arm, a current supplied to the lift actuator, a power discharged from a battery of the lift control system, or combinations thereof.

15. The lifting device of claim 8 wherein the lift control system comprises a battery operatively coupled to the lift actuator and the processor executes the computer readable and executable instructions to:

determine an accumulated number of initiated battery charging events;

determine an accumulated number of incomplete battery charging events; and determine an accumulated number of battery replacements.

16. The lifting device of claim 8 wherein:

the lift actuator comprises an actuator arm with an upper limit switch and a lower limit switch electrically coupled to the lift control system; and the processor executes the computer readable and executable instructions to:

determine an accumulated number of upper end positions reached based on signals received from the upper limit switch; and determine an accumulated number of lower end positions reached based on signals received from the lower limit switch.

17. The lifting device of claim 8 wherein the processor further executes the computer readable and executable instructions to:

monitor a current supplied to the lift actuator when the lifting device is actuated;

discontinue the current supplied to the lift actuator when the current exceeds a current threshold value;

provide an indication with the indicator that the current supplied to the lift actuator has exceeded the current threshold value; and determine an accumulated number of overload stops based on the current supplied to the lift actuator and store the accumulated number of overload stops in the memory of the lift control system.

18. The lifting device of claim 8 wherein the lift control system is communicatively connectable to an external computer system and the processor executes the computer readable and executable instructions to:

upload at least one operating characteristic of the lifting device to the external computer system; and receive service parameters and operational parameters from the external computer system when the external computer system is communicatively connected to the lift control system.

19. The lifting device of claim 8 wherein:

the lift control system further comprises a wireless controller communicatively coupled to the control unit, wherein the wireless controller comprises a processor and a memory having computer readable and executable instructions;

the processor of the control unit further executes the computer readable and executable instructions to upload at least one operating characteristic of the lifting device to the wireless controller; and the processor of the wireless controller executes the computer readable and executable instructions of the wireless controller to download the service constant and at least one lift operational parameter to the memory of the control unit of the lift control system.

20. A method for operating a lifting device comprising a lift actuator for raising and lowering a load coupled to the lifting device, the method comprising:

determining an operating characteristic of the lift actuator as the lift actuator is actuated;

determining an operating time of the lift actuator as the lift actuator is actuated;

determining an accumulated load-time parameter for the lift actuator based on the operating characteristic and the operating time;

comparing the accumulated load-time parameter to a service constant indicative of a structural component requiring service; and activating an indicator when the accumulated load-time parameter is greater than the service constant.

21. The lift control system of claim 1 wherein the control unit is electronically coupled to at least one indicator.

22. The lift control system of claim 1 wherein the processor further executes the computer readable and executable instructions to store the accumulated load-time parameter in the memory of the lift control system.

23. The lift control system of claim 1 wherein the processor further executes the computer readable and executable instructions to upload at least one of the accumulated load-time parameter, the operating characteristic, and the operating time of the lifting device to a data storage device.

24. The lift control system of claim 23 wherein at least one of the accumulated load-time parameter, the operating characteristic, and the operating time of the lifting device are stored in the storage device in a file history unique to the lifting device.

25. The lifting device of claim 8 wherein the control unit is electronically coupled to at least one indicator.

26. The lifting device of claim 8 wherein the processor further executes the computer readable and executable instructions to store the accumulated load-time parameter in the memory of the lift control system.

27. The lifting device of claim 8 wherein the indication that a lift structural component or lift electrical component requires service is displayed by at least one indicator.

* * * * *